(12) United States Patent
Caveney et al.

(10) Patent No.: US 8,701,252 B2
(45) Date of Patent: Apr. 22, 2014

(54) HOOK AND LOOP TIE WITH A NON-SLIP AREA

(75) Inventors: Jack E. Caveney, North Palm Beach, FL (US); David W. West, Naperville, IL (US); Gary L. Zernach, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 142 days.

(21) Appl. No.: 12/957,528

(22) Filed: Dec. 1, 2010

(65) Prior Publication Data

US 2011/0107559 A1    May 12, 2011

Related U.S. Application Data

(63) Continuation-in-part of application No. 12/704,066, filed on Feb. 11, 2010, and a continuation-in-part of application No. 12/470,921, filed on May 22, 2009, now Pat. No. 8,276,243.

(60) Provisional application No. 61/119,398, filed on Dec. 3, 2008, provisional application No. 61/056,127, filed on May 27, 2008.

(51) Int. Cl.
 *B65D 63/14* (2006.01)
(52) U.S. Cl.
 USPC .............................. 24/306; 24/16 R
(58) Field of Classification Search
 USPC ............... 24/445, 447, 448, 450, 451, 452; 428/100
 See application file for complete search history.

(56) References Cited

U.S. PATENT DOCUMENTS

| | | |
|---|---|---|
| 3,708,833 A | 1/1973 | Ribich et al. |
| 4,088,136 A | 5/1978 | Hasslinger et al. |
| 4,396,013 A | 8/1983 | Hasslinger |
| 4,569,348 A | 2/1986 | Hasslinger |
| 4,706,914 A | 11/1987 | Ground |
| 4,775,310 A | 10/1988 | Fischer |
| 4,794,028 A | 12/1988 | Fischer |
| 4,815,172 A | 3/1989 | Ward |

(Continued)

FOREIGN PATENT DOCUMENTS

| | | |
|---|---|---|
| DE | 29602362 U1 | 1/1997 |
| WO | 0027235 A | 5/2000 |

OTHER PUBLICATIONS

Aplix, Inc. webpage for Coroplast knit loop with pressure sesnsitive adhesive backing, 1 page, Apr. 24, 2008.

(Continued)

*Primary Examiner* — Robert J Sandy
*Assistant Examiner* — Michael Lee
(74) *Attorney, Agent, or Firm* — Christopher S. Clancy; James H. Williams

(57) ABSTRACT

Certain embodiments of the present invention provide a hook and loop tie for securing a bundle of cables. The hook and loop tie comprises a loop component, a non-slip component, and a hook component. The loop component has a first end and a second end opposite the first end. The non-slip component is affixed to the loop component and extends from the first end of the loop component toward the second end of the loop component. The hook component is affixed to the loop component, extends from the second end of the loop component toward the first end of the loop component, and overlaps at least a portion of the non-slip component.

18 Claims, 19 Drawing Sheets

(56) References Cited

U.S. PATENT DOCUMENTS

| | | |
|---|---|---|
| 4,872,243 A | 10/1989 | Fischer |
| 5,200,245 A | 4/1993 | Brodrick, Jr. |
| 5,449,128 A * | 9/1995 | Crisci, Jr. .................. 242/580 |
| 5,604,961 A * | 2/1997 | Cole .......................... 24/306 |
| 5,691,026 A | 11/1997 | Zinke et al. |
| 5,691,027 A | 11/1997 | Eckhardt et al. |
| 5,786,062 A * | 7/1998 | Callahan et al. ............ 428/100 |
| 5,870,849 A * | 2/1999 | Colson, Jr. .................. 43/25.2 |
| 6,129,964 A | 10/2000 | Seth |
| 6,205,623 B1 | 3/2001 | Shepard et al. |
| 6,349,452 B1 * | 2/2002 | Cisneros .................... 24/306 |
| 6,481,063 B2 | 11/2002 | Shepard et al. |
| 7,132,144 B2 | 11/2006 | Roberts |
| 2003/0074768 A1 | 4/2003 | Shepard et al. |
| 2005/0015938 A1 | 1/2005 | Shepard et al. |

OTHER PUBLICATIONS

Velcro Industries, N.V. product literature for Velstrap brand straps with non-slip neoprene. Page 17; front cover; and back cover. Mar. 2006, 3 pages.

Velcro Industries, N.V. product literature for Velstrap brand straps with non-slip neoprene. Page 24, front cover; and back cover. May 2008, 3 pages.

* cited by examiner

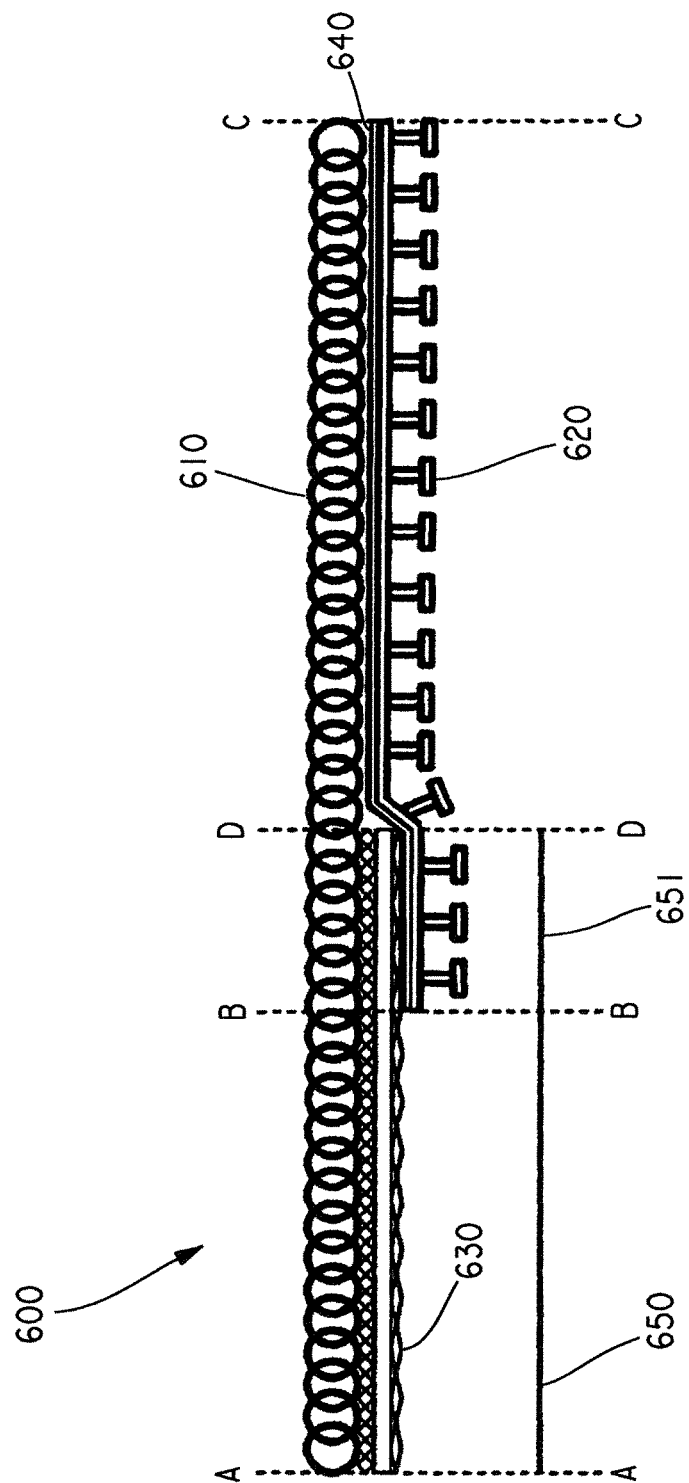

HOOK AND LOOP TIE WITH A NON-SLIP AREA

CROSS REFERENCE TO RELATED APPLICATIONS

This application is a continuation-in-part of U.S. patent application Ser. No. 12/704,066, filed on Feb. 11, 2010, which is a continuation-in-part of U.S. patent application Ser. No. 12/470,921, filed on May 22, 2009, which claims priority to U.S. Provisional Patent Application No. 61/119,398, filed on Dec. 3, 2008, and U.S. Provisional Patent Application No. 61/056,127, filed on May 27, 2008. Each of these applications is incorporated by reference in its entirety.

BACKGROUND OF THE INVENTION

The present invention relates to a hook and loop tie. More particularly, the present invention relates to a hook and loop tie with a non-slip area for improved bundle tensioning without risk of damage to the bundle.

Hook and loop fasteners are well known in the art. Examples of prior art hook and loop fasteners include U.S. Pat. No. 5,200,245, which is incorporated by reference in its entirety, Velstrap brand straps with non-slip neoprene (Velcro Industries, N.V.), and Coroplast knit loop with pressure sensitive adhesive backing (Aplix, Inc.).

However, notwithstanding these prior art hook and loop fasteners, there is still a need for an improved hook and loop tie with a non-slip area for improved bundle tensioning without risk of damage to the bundle.

SUMMARY OF THE INVENTION

Certain embodiments of the present invention provide a hook and loop tie for securing a bundle of cables. The hook and loop tie comprises a loop component, a non-slip component, and a hook component. The loop component has a first end and a second end opposite the first end. The non-slip component is affixed to the loop component and extends from the first end of the loop component toward the second end of the loop component. The hook component is affixed to the loop component, extends from the second end of the loop component toward the first end of the loop component, and overlaps at least a portion of the non-slip component.

Certain embodiments of the present invention provide a method of constructing a hook and loop tie for securing a bundle of cables. The method comprises the steps of providing a loop component, affixing a non-slip component to the loop component, and affixing a hook component to the loop component. The loop component has a first end and a second end opposite the first end. The non-slip component extends from the first end of the loop component toward the second end of the loop component. The hook component extends from the second end of the loop component toward the first end of the loop component and overlaps at least a portion of the non-slip component.

BRIEF DESCRIPTION OF THE DRAWINGS

FIGS. 16-19 illustrate construction details of a hook and loop tie according to a sixth embodiment of the present invention.

DETAILED DESCRIPTION OF THE INVENTION

Figure 1:
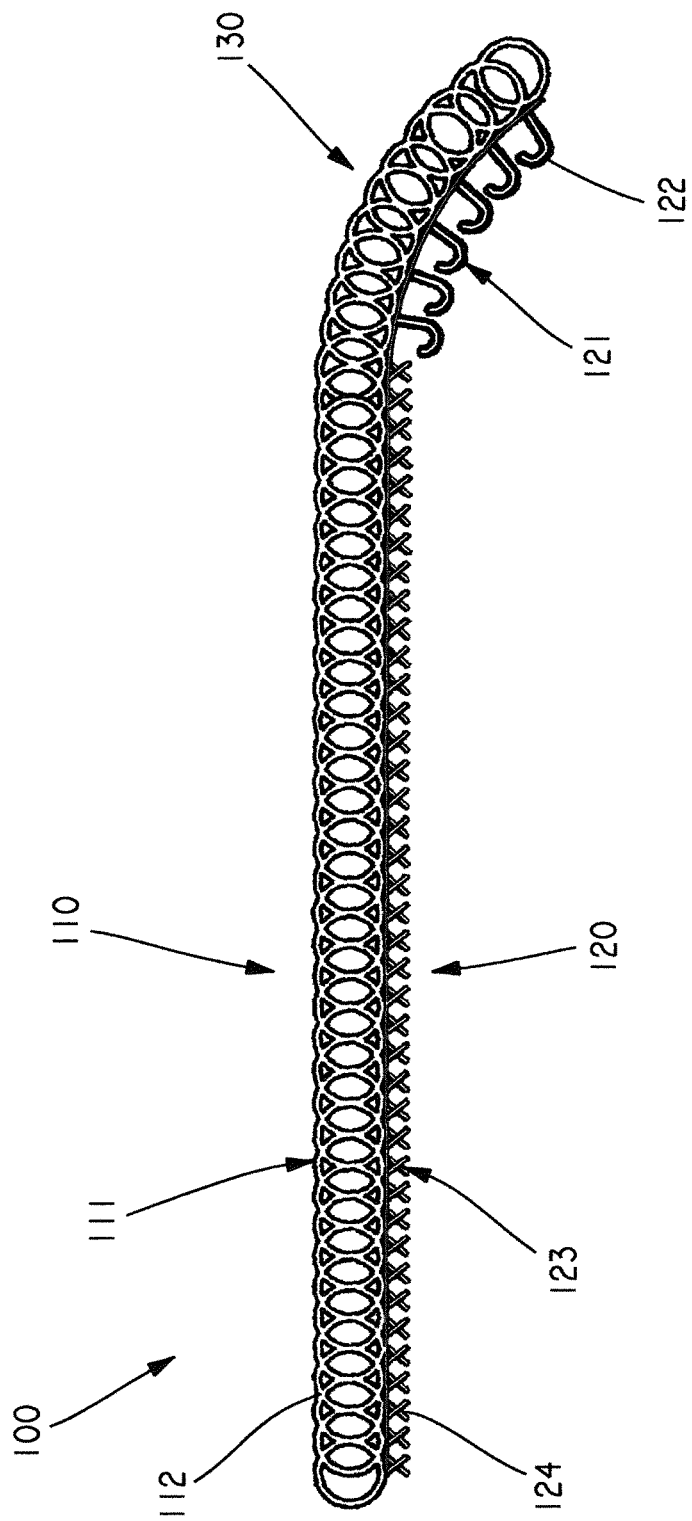
FIG. 1 is a side view of a hook and loop tie according to a first embodiment of the present invention.
Figure 2:
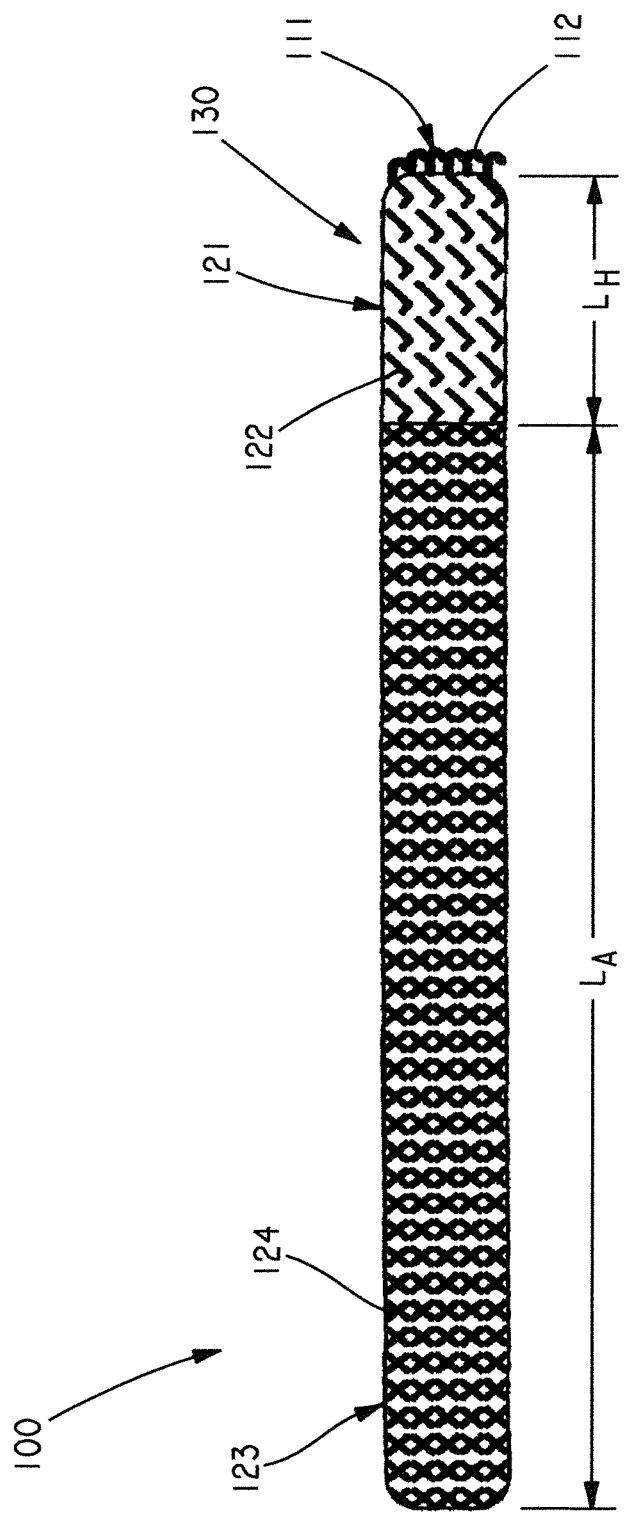
FIG. 2 is a bottom view of the hook and loop tie of FIG. 1.
Figure 3:
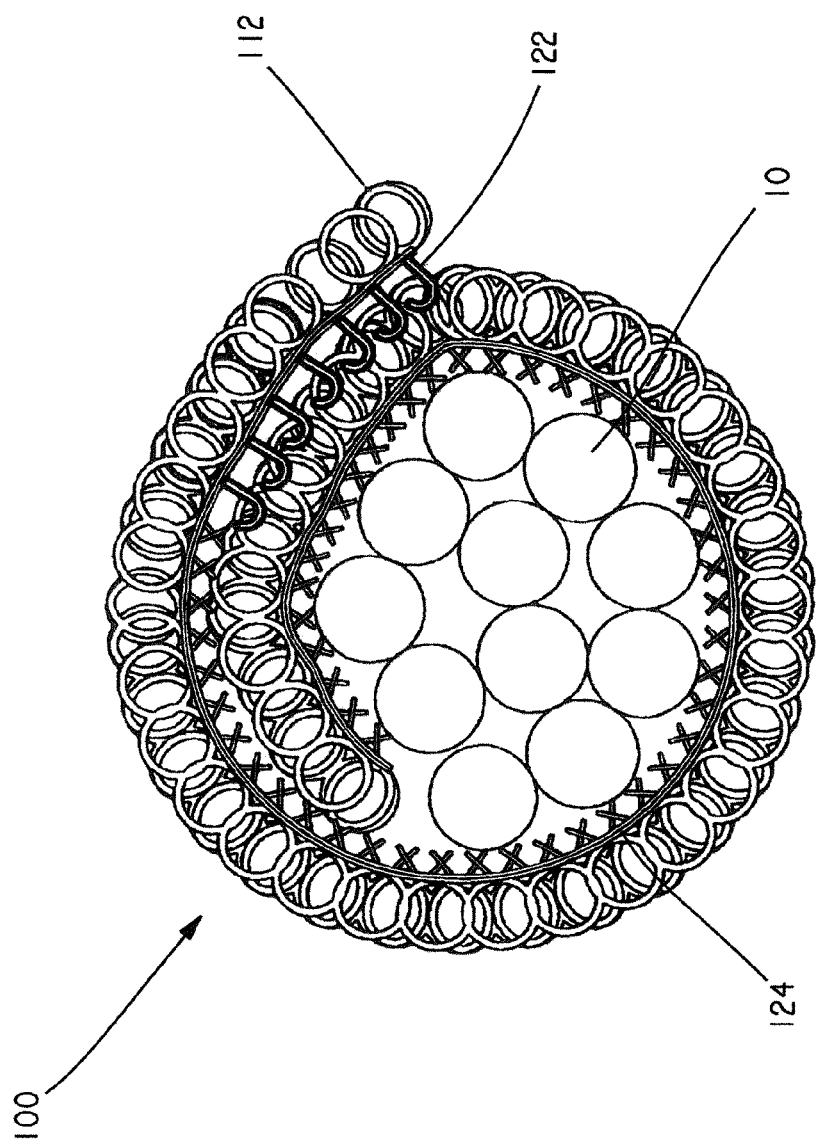
FIG. 3 is a side view of the hook and loop tie of FIG. 1, showing the hook and loop tie securing a bundle of wires.

FIGS. 1-3 illustrate a hook and loop tie 100 according to a first embodiment of the present invention.

As best seen in FIG. 1, the hook and loop tie 100 includes a first side 110 and a second side 120. The first side 110 of the hook and loop tie 100 includes a loop fastening area 111. The loop fastening area 111 includes a plurality of loop fastening elements 112, such as knit loops, woven loops, or non-woven textiles suitable to mate with hooks.

The second side 120 of the hook and loop tie 100 includes a hook fastening area 121. The hook fastening area 121 includes a plurality of hook fastening elements 122. For example, the hook fastening elements 122 may be shaped like fishhooks, mushroom hooks, microhooks, or other types of hooks.

The second side 120 of the hook and loop tie 100 also includes an adhesive area 123. The adhesive area 123 includes an adhesive 124, such as a pressure sensitive adhesive. Preferably, the adhesive 124 is a releasable and/or reusable adhesive, such as a rubber adhesive used on flat back tape.

As best seen in FIG. 1, the hook and loop tie 100 includes a formed tip 130. More particularly, the formed tip 130 is arcuate. As best seen in FIG. 3, the arcuate formed tip 130 matches a shape of a bundle of wires 10. Alternatively, the formed tip 130 may be straight, bent, or otherwise formed into shapes that match a variety of bundled objects.

As best seen in FIG. 2, the length $L_A$ of the adhesive area 123 is greater than a length $L_H$ of the hook fastening area 121. That is, a majority of the second side 120 of the hook and loop tie 100 includes the adhesive area 123. Preferably, as best seen in FIG. 2, the hook fastening area 121 is limited to the formed tip 130 of the hook and loop tie 100. Preferably, as best seen in FIG. 3, the length $L_A$ of the adhesive area 123 is greater than the circumference of the wire bundle 10.

As best seen in FIG. 3, the hook and loop tie 100 is wrapped around the wire bundle 10. The adhesive area 123 holds to the wire bundle 10 while the hook and loop tie 100 is tightened around the wire bundle 10, allowing installation using one hand. The adhesive area 123 bonds to the wire bundle 10, eliminating any slippage between the hook and loop tie 100 and the wire bundle 10. The adhesive area 123 also bonds to the first side 110 of the hook and loop tie 100, securing the wire bundle 10. The hook fastening elements 122 on the hook fastening area 121 engage the loop fastening elements 112 on the loop fastening area 111, further securing the wire bundle 10. To release the hook and loop tie 100, the hook fastening area 121 is separated from the loop fastening area 111. Because the adhesive 124 is releasable, the adhesive area 123 may be separated from the first side 110 of the hook and loop tie 100 and the wire bundle 10.

In certain embodiments of the present invention, the second side 120 of the hook and loop tie 100 includes a release liner (not shown), such as paper, plastic, or other suitable material, to cover the adhesive area 123 and protect the adhesive 124 while not in use.

In certain embodiments of the present invention, the loop fastening elements 111 and the hook fastening elements 122 are interchangeable. That is, the loop fastening elements 111 on the first side 110 of the hook and loop tie 100 may be replaced with hook fastening elements 122, and the hook fastening elements 122 on the second side 120 of the hook and loop tie 100 may be replaced with loop fastening elements 111.

The adhesive area 123 may be referred to more generally as a non-slip area 123. The non-slip area 123 may include adhesives 124, such as pressure sensitive adhesives, or non-adhesives 124, such as thermoplastic elastomers (e.g., Santoprene), synthetic rubbers (e.g., Neoprene), and/or other non-adhesive tacky substrates.

FIGS. 4-7 illustrate construction details for a hook and loop tie 200 according to a second embodiment of the present invention. The hook and loop tie 200 is similar to the hook and loop tie 100 of FIGS. 1-3. That is, the hook and loop tie 200 includes a loop component 210, such as a piece of loop fabric, a hook component 220, such as a piece of loop fabric, and differential tape 230, which are similar to the loop fastening area 111, the hook fastening area 121, and the adhesive area 123, respectively.

Figure 4:
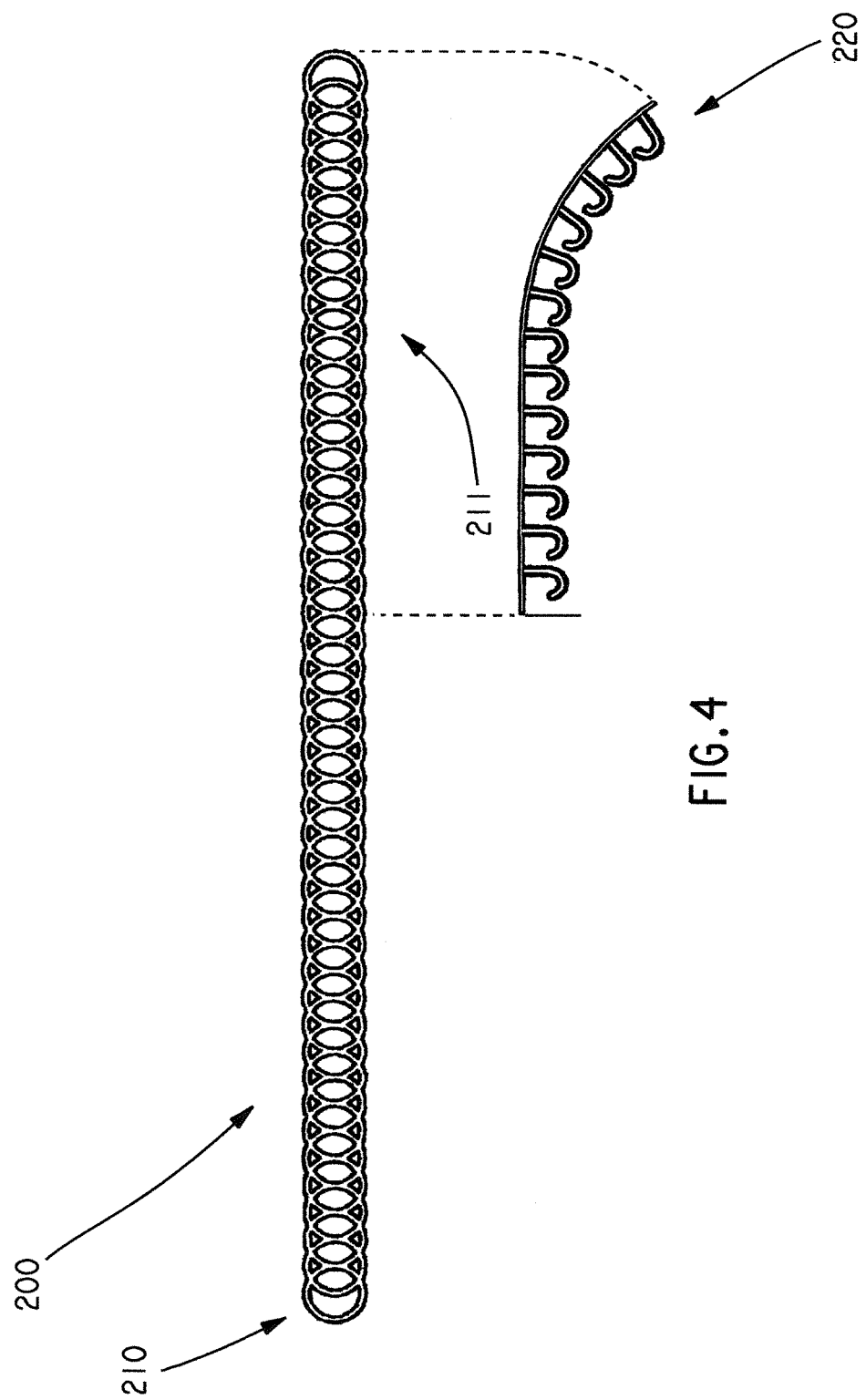
FIGS. 4-7 illustrate construction details for a hook and loop tie according to a second embodiment of the present invention.

As best seen in FIG. 4, the hook component 220 is attached to the loop component 210, for example, using a permanent adhesive, such as a rubber or acrylic adhesive applied in a thick enough layer to be permanent. The hook component 220 is disposed at a distal end of the loop component 210, and covers a first portion 211 of the loop component 210. Preferably, the length of the loop component 210 is 7 inches, and the length of the hook component 220 is 3 inches. The shape of the hook component 220 is curved, as best seen in FIG. 4. The shape of the loop component 210, and thus, the hook and look tie 200, conforms to the shape of the hook component 220.

Figure 5:
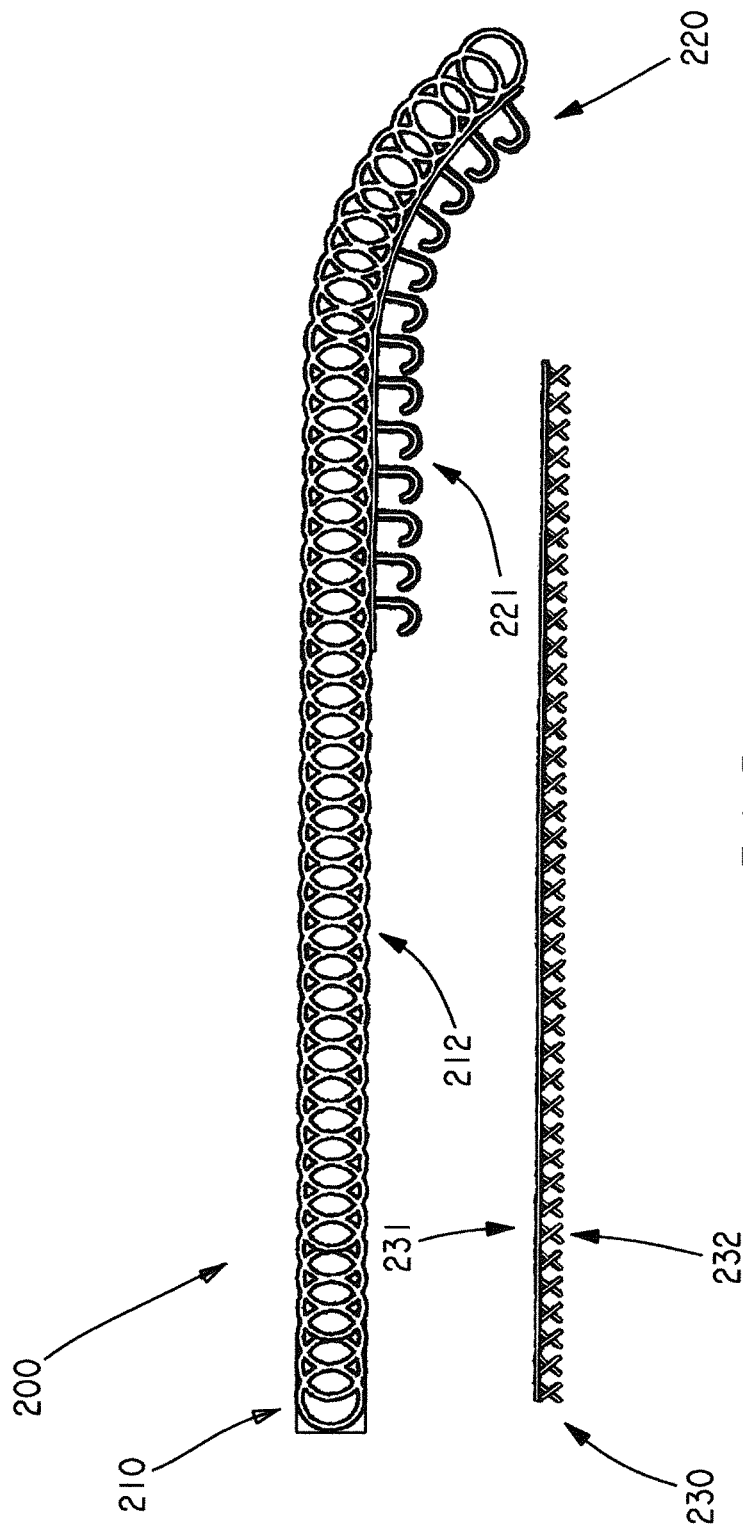

As best seen in FIG. 5, the differential tape 230 is attached to the loop component 210 and the hook component 220. The differential tape 230 covers a second portion 212 of the loop component 210, as well as a first portion 221 of the hook component 220. That is, the differential tape 230 overlaps the first portion 221 of the hook component 220, thereby increasing the overall strength of the hook and loop tie 200. Preferably, the length of the differential tape 230 is 5½ inches. In certain embodiments of the present invention, the first portion 221 of the hook component 220 may be flattened (not shown).

Figure 6:
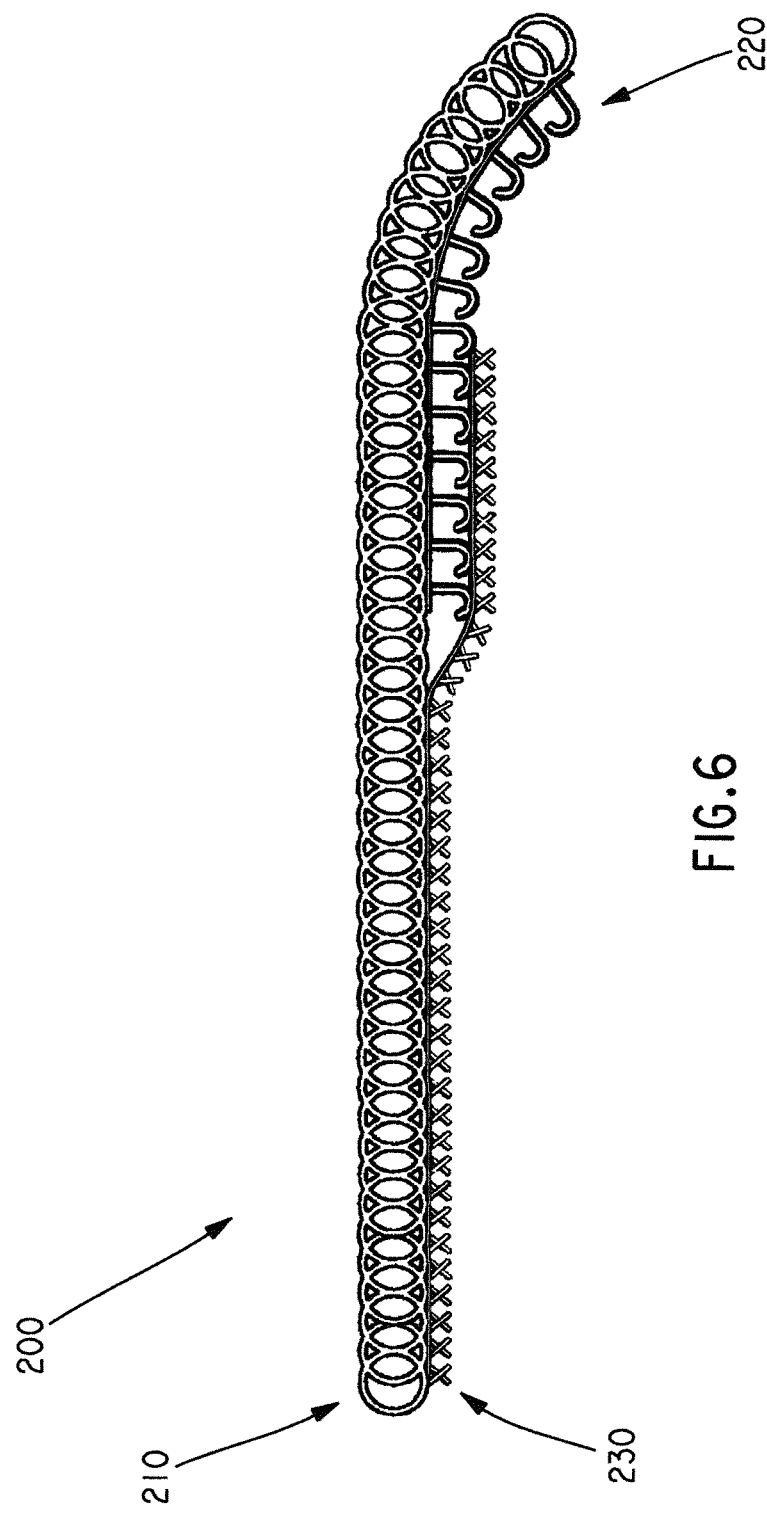
Figure 7:
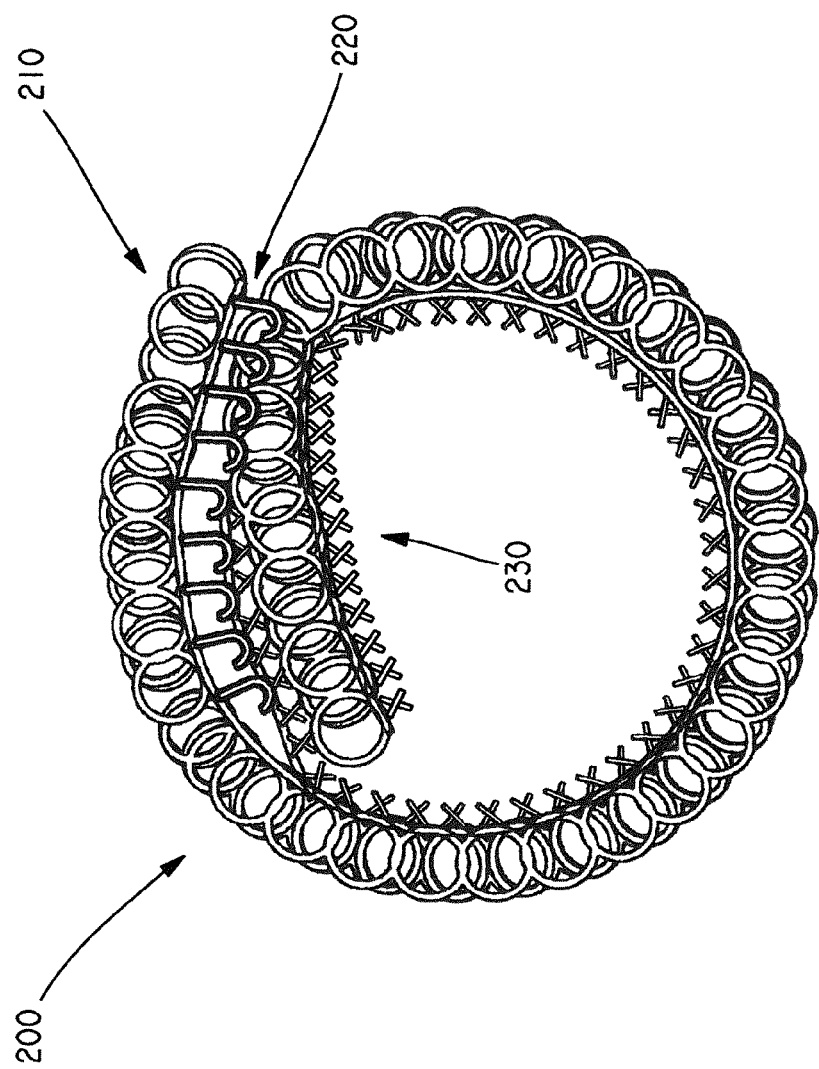

The differential tape 230 includes a first side 231 and a second side 232. The first side 231 includes a first adhesive, such as a permanent adhesive, for securing the differential tape 230 to the loop component 210 and the first portion 221 of the hook component 220. The second side 232 includes a second adhesive for securing the hook and loop tie 200 to a bundle of cables (not shown). Preferably, the second side 232 of the differential tape 230, which contacts the bundle of cables, is similar to flat back tape, which is stronger than masking tape and removable without leaving a residue. A finished hook and loop tie 200 is shown in FIG. 6. A bundled hook and loop tie 200 is shown in FIG. 7.

Figure 8:
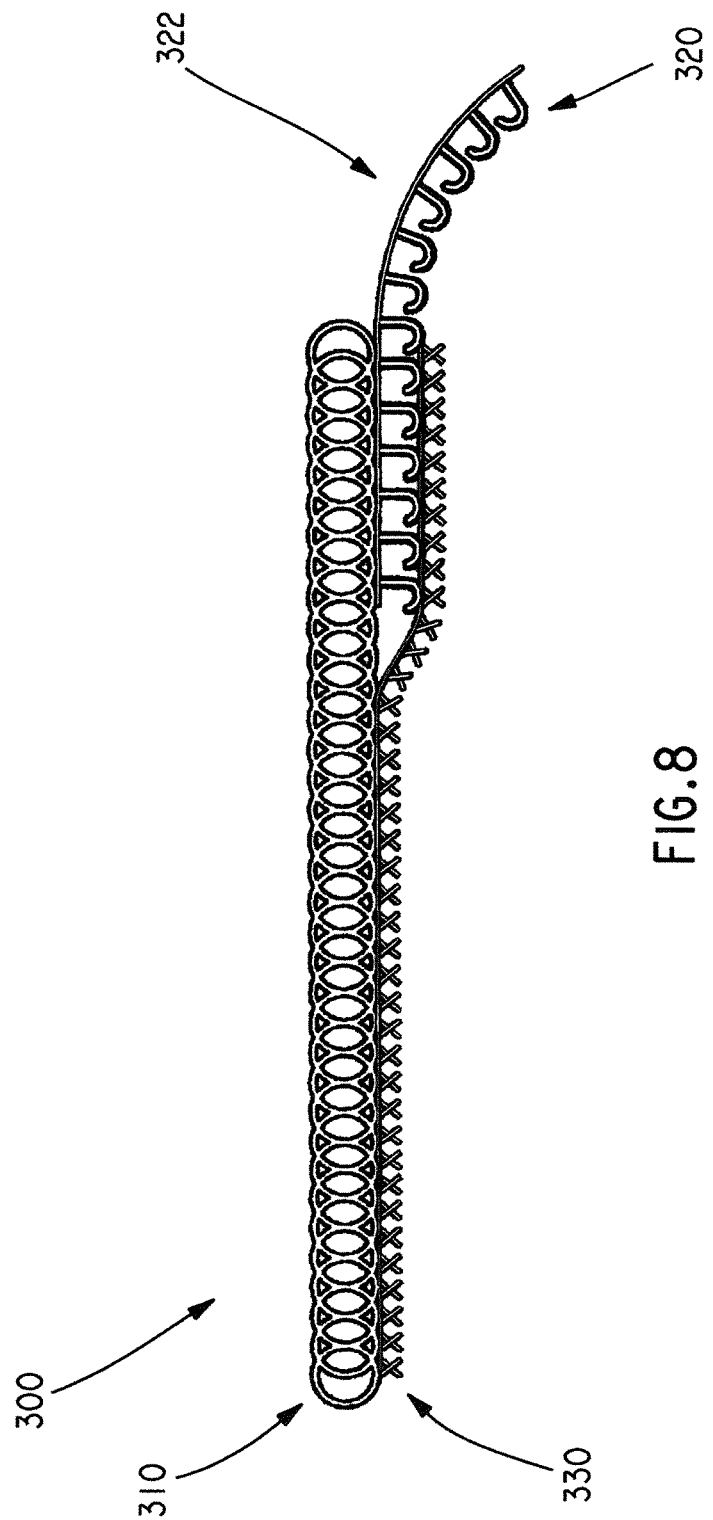
FIGS. 8-9 illustrate construction details for a hook and loop tie according to a third embodiment of the present invention.
Figure 9:
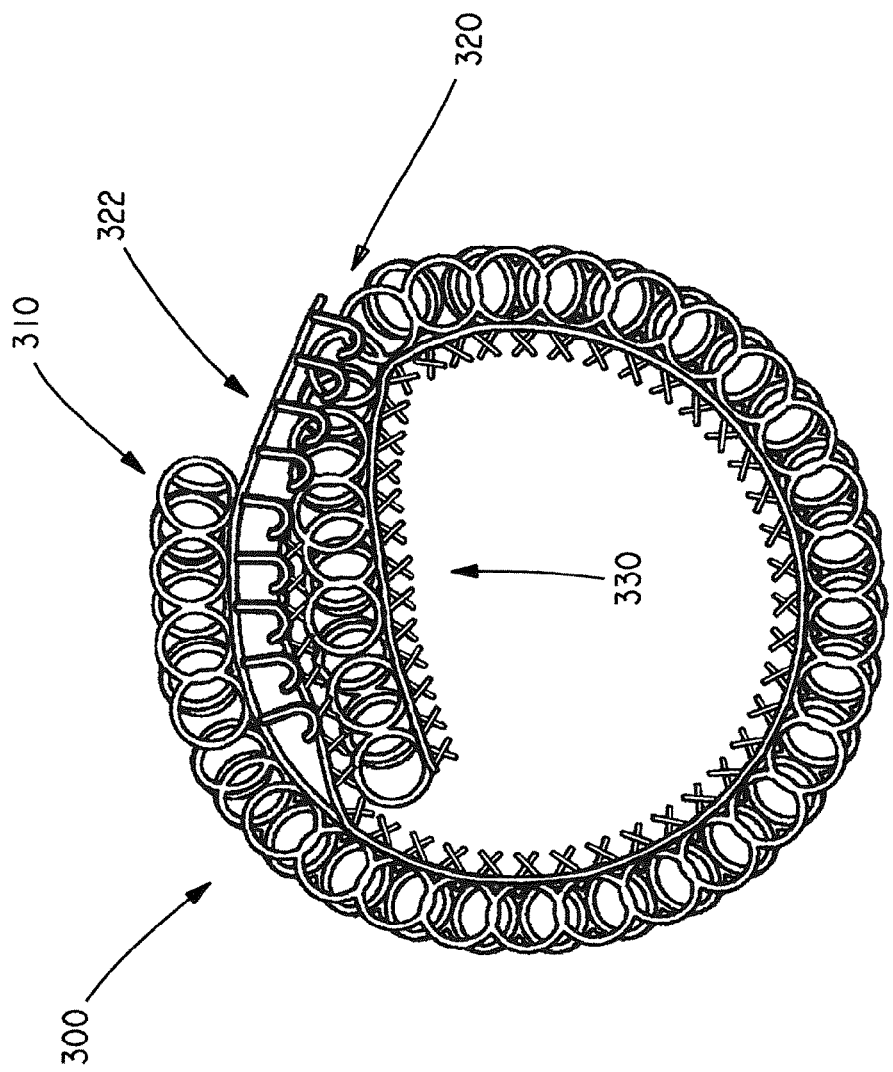

FIGS. 8-9 illustrate construction details for a hook and loop tie 300 according to a third embodiment of the present invention. The hook and loop tie 300 is similar to the hook and loop tie 200 of FIGS. 4-7. That is, the hook and loop tie 300 includes a loop component 310, such as a piece of loop fabric, a hook component 320, such as a piece of hook fabric, and differential tape 330, which are similar to the loop component 210, the hook component 220, and the differential tape 230, respectively. However, unlike the hook and loop tie 200, a second portion 322 of the hook component 320 extends beyond a distal end of the loop component 310, as best seen in FIG. 8. In certain embodiments of the present invention, the second or extended portion 322 of the hook component 320 provides the following advantages: (1) a lower profile; (2) an area on which to write; (3) easier removal; and (4) less loop component. A finished hook and loop tie 300 is shown in FIG. 8. A bundled cable tie 300 is shown in FIG. 9.

Figure 10:
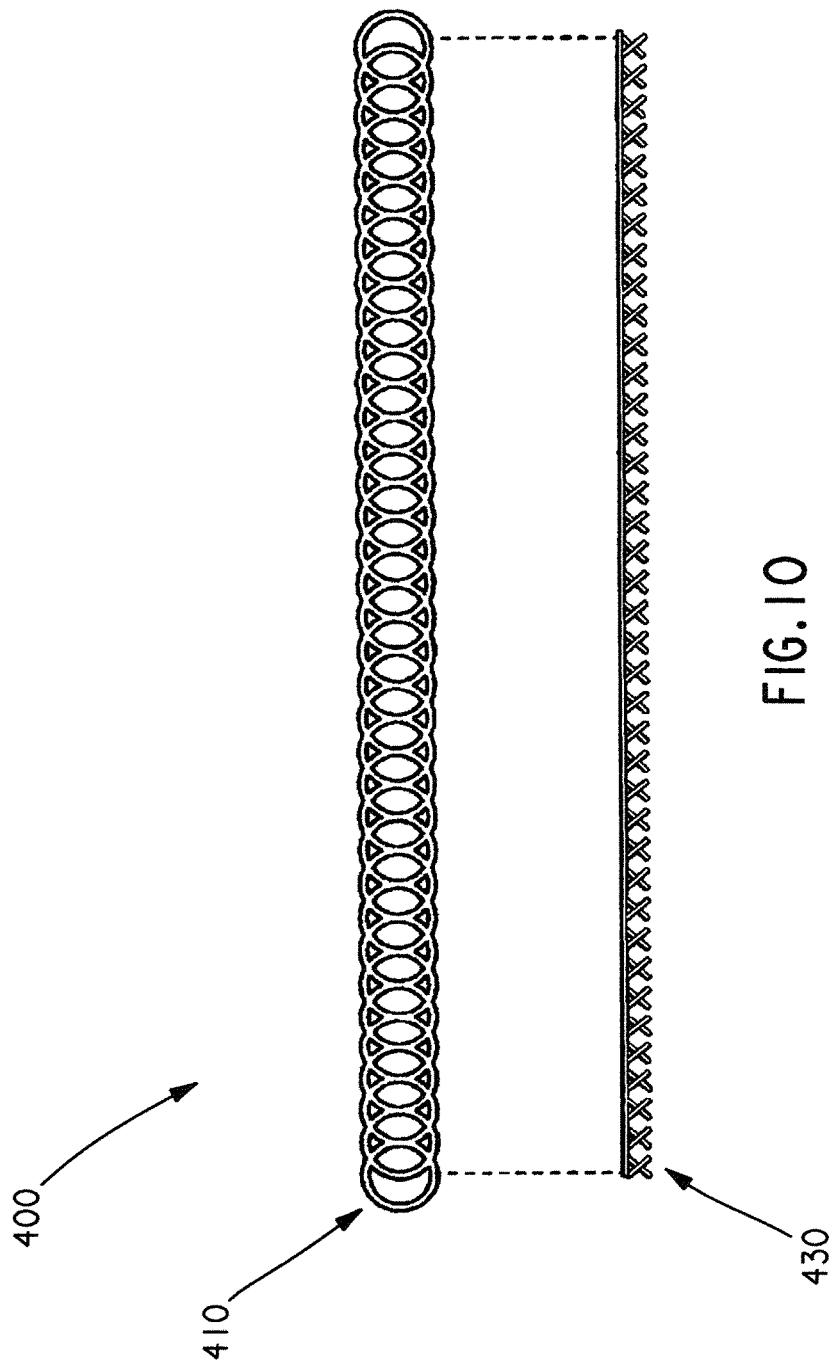
FIGS. 10-13 illustrate construction details for a hook and loop tie according to a fourth embodiment of the present invention.
Figure 11:
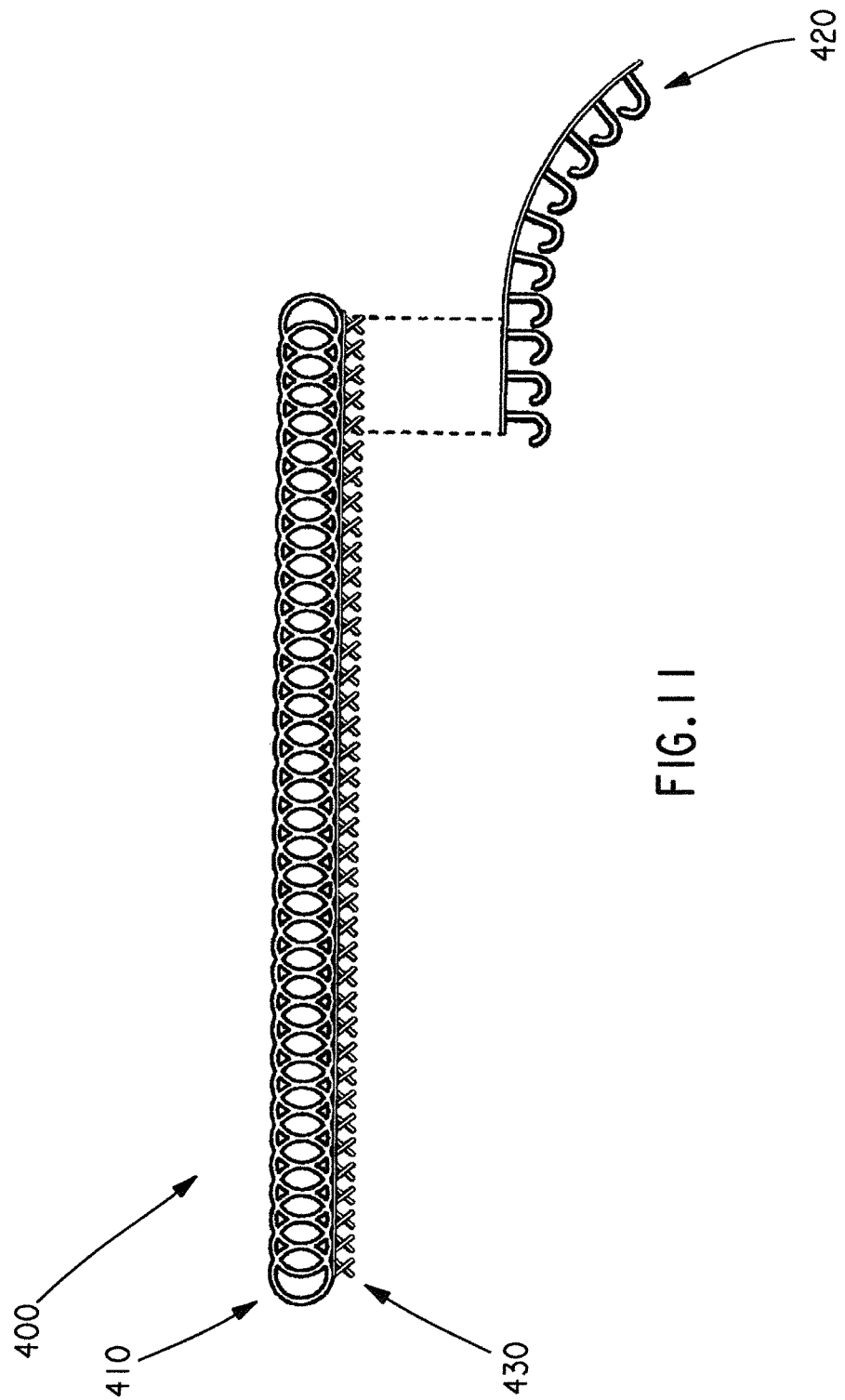
Figure 12:
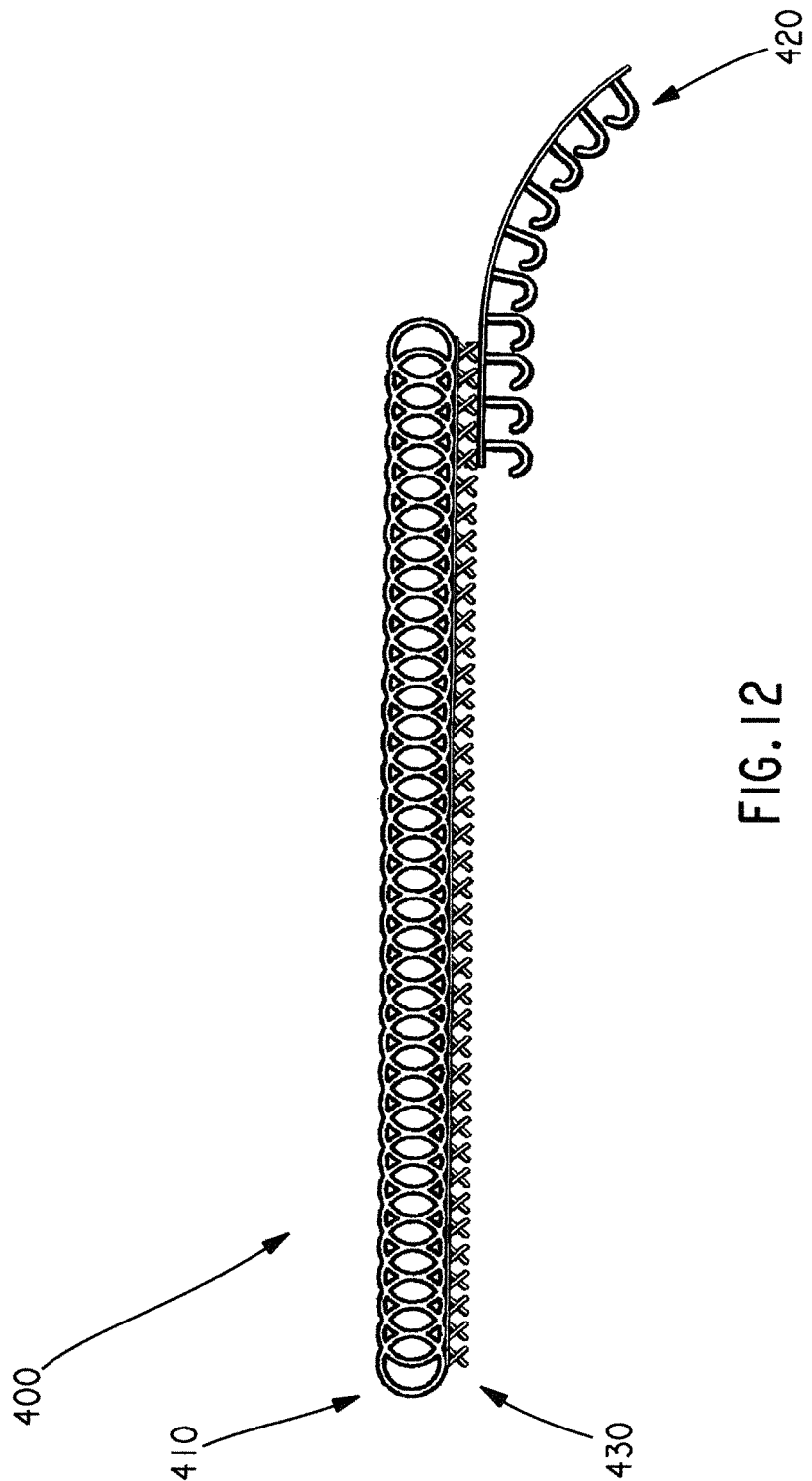
Figure 13:
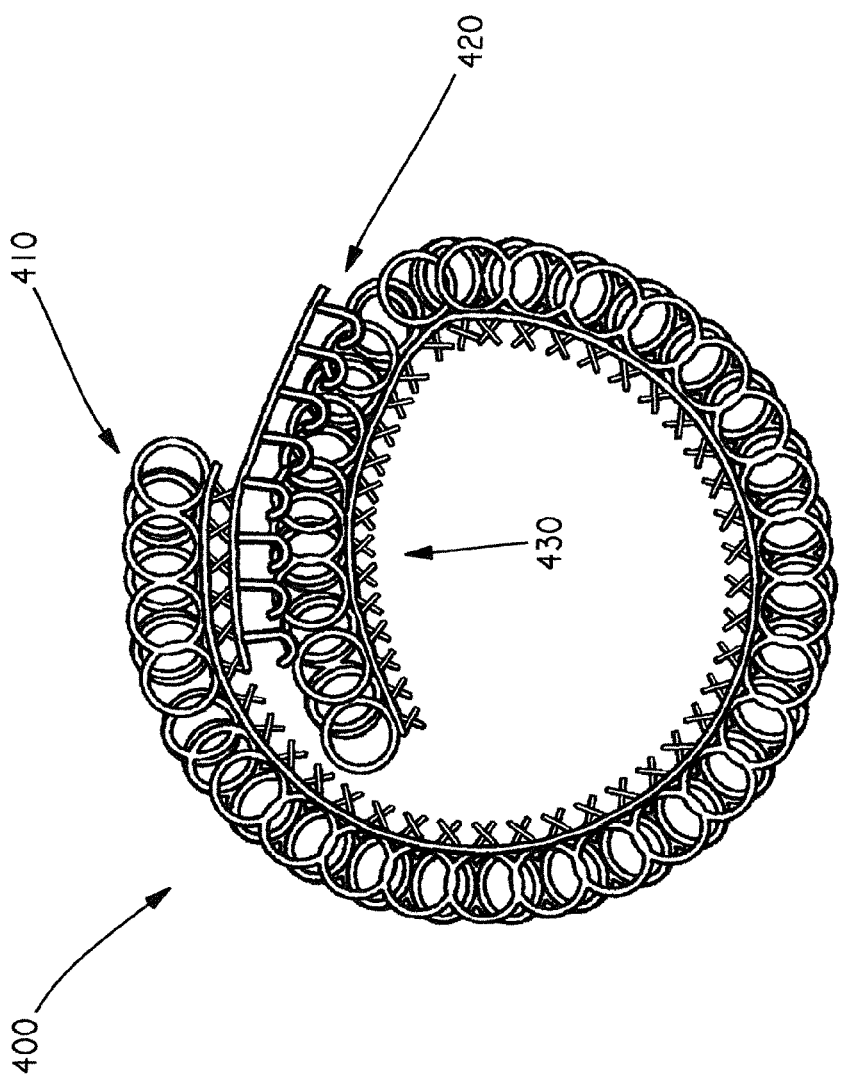

FIGS. 10-13 illustrate construction details for a hook and loop tie 400 according to a fourth embodiment of the present invention. The hook and loop tie 400 is similar to the hook and loop tie 300 of FIGS. 8-9. That is, the hook and loop tie 400 includes a loop component 410, such as a piece of loop fabric, a hook component 420, such as a piece of hook fabric, and differential tape 430, which are similar to the loop component 310, the hook component 320, and the differential tape 330, respectively. However, unlike the hook and loop tie 300, the differential tape 430 is disposed between the loop component 410 and the hook component 420, as best seen in FIG. 11. That is, the differential tape 430 is attached to the loop component 410, as best seen in FIG. 10, and the hook component 420 is attached to the differential tape 430, as best seen in FIG. 11. A finished hook and loop tie 400 is shown in FIG. 12. A bundled tie 400 is shown in FIG. 13.

Figure 14:
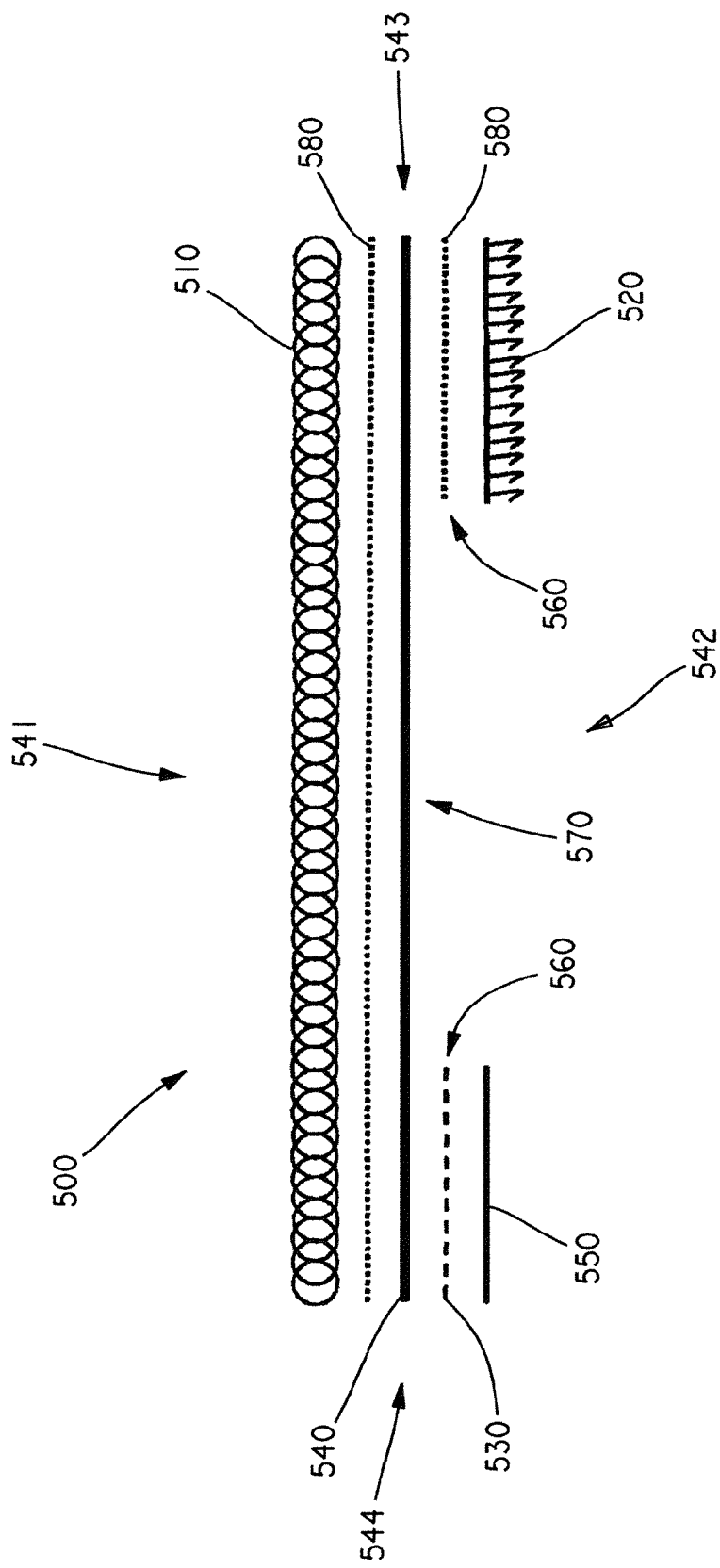
FIGS. 14-15 illustrate construction details of a hook and loop tie according to a fifth embodiment of the present invention.
Figure 15:
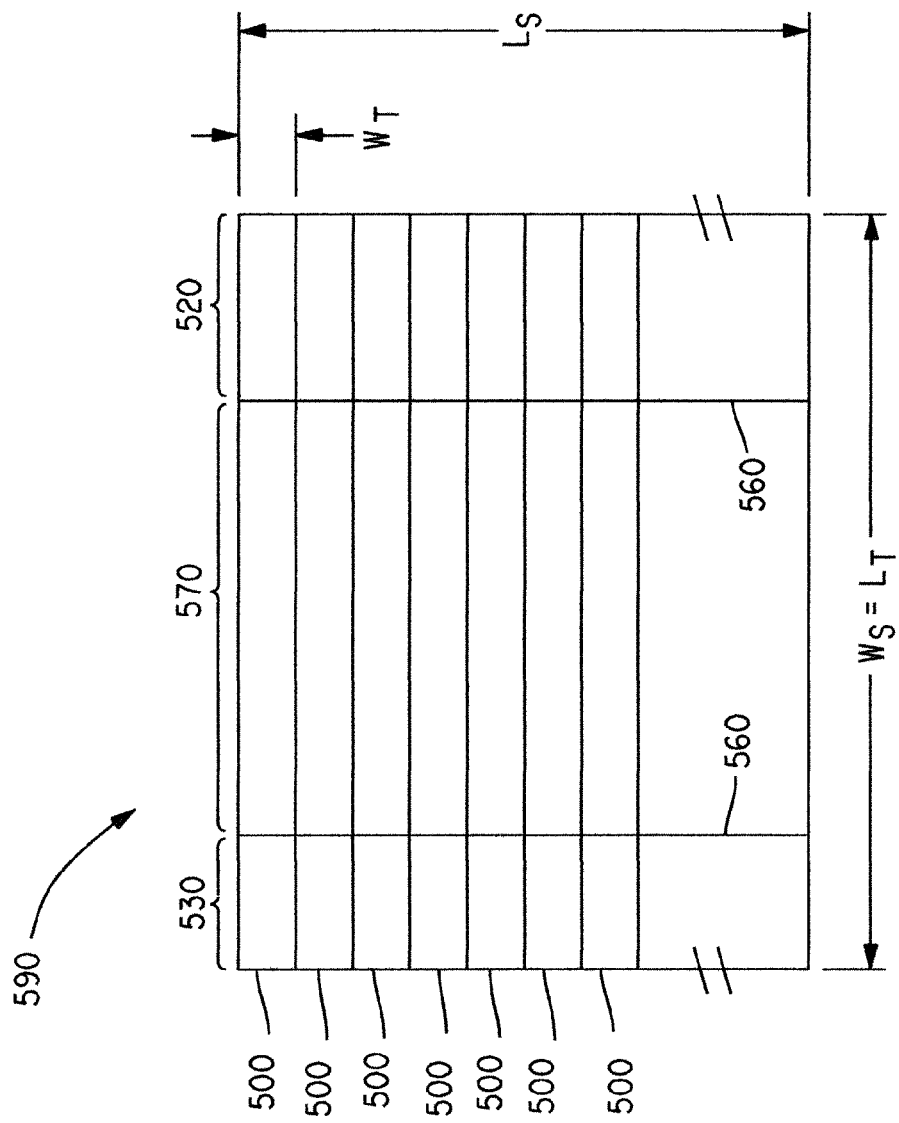
Figure 16:
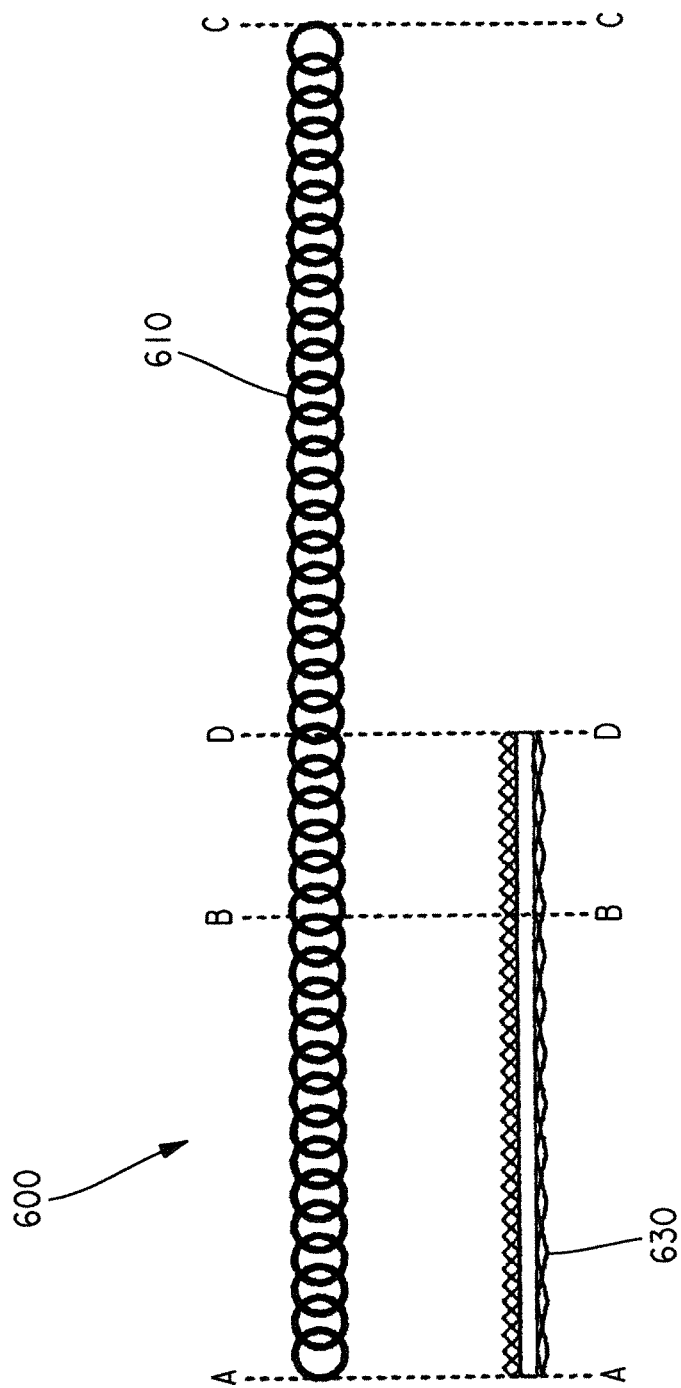

FIGS. 14-15 illustrate construction details for a hook and loop tie 500 according to a fifth alternative embodiment of the present invention. The hook and loop tie 500 is similar to the hook and loop tie 100 of FIGS. 1-3. That is, the hook and loop tie 500 includes a loop component 510, a hook component 520, and a non-slip component 530, which are similar to the loop fastening area 111, the hook fastening area 121, and the adhesive or non-slip area 123, respectively, as described above.

As shown in FIG. 14, the hook and loop tie 500 includes an optional base component 540 for supporting the other components of the hook and loop tie 500 and an optional release liner 550 for protecting the non-slip component 530 when not in use. Preferably, the optional release liner includes paper, plastic, or other materials capable of protecting the non-slip component 530 when not in use (e.g., silicone lined paper or plastic).

Additionally, as shown in FIGS. 14-15, proximate ends 560 of the hook component 520 and the non-slip component 530 are spaced apart to define a gap 570 therebetween. Alternatively, proximate ends 560 of the hook component 520 and the non-slip component 530 may be abutting (similar to the hook and loop tie 100 of FIGS. 1-3) or overlapping (similar to the hook and loop ties 200, 300, 400, and 600 of FIGS. 4-7, 8-9, 10-13, and 16-19, respectively).

The base component 540 includes a first side 541, a second side 542 opposite the first side 541, a first end 543, and a second end 544 opposite the first end 543. Preferably, the base component 540 includes a polymer film, such as polyester or polyethylene terephthalate film (e.g., Mylar), or other materials capable of supporting the other components of the hook and loop tie 500.

The loop component 510 is affixed to the first side 541 of the base component 540, for example, using permanent adhesive 580, such as chemically or thermally activated adhesive (e.g., hot melt adhesive). Preferably, the loop component 510 and the base component 540 are the same length. Alternatively, the loop component 540 may be shorter or longer than the base component 540 and disposed at any location along the first side 541 of the base component 540. Preferably, the loop component 510 includes loop fabric, such as nylon or polypropylene loop fabric (e.g., Velcro), or other materials capable of engaging corresponding hook fastening elements on the hook component 520.

The hook component 520 is affixed to the second side 542 of the base component 540, for example, using the permanent adhesive 580. Preferably, the hook component 520 is disposed at the first end 543 of the base component 540 and extends therefrom toward the second end 544 of the base component 540. Alternatively, the hook component 520 may be disposed at any location along the second side 542 of the base component 540, other than that of the non-slip component 530. Preferably, the hook component 520 includes hook fabric, such as nylon or polypropylene hook fabric (e.g., Velcro), or other materials capable of engaging loop fastening elements on the loop component 520. The loop component 510 and the hook component 520 are interchangeable.

The non-slip component 530 is affixed to the second side 542 of the base component 540. Preferably, the non-slip component 530 is disposed at the second end 544 of the base component 540 and extends therefrom toward the first end 543 of the base component 540. Alternatively, the non-slip component 530 may be disposed at any location along the second side 542 of the base component 540, other than that of the non-slip component 530. Preferably, the non-slip component 540 includes removable adhesive, such as pressure sensitive adhesive, or other materials capable of securing a bundle of cables while the hook and loop tie 500 is being installed.

As shown in FIG. 14, the base component 540 is a separate component. Alternatively, the base component 540 may be part of the other components of the hook and loop tie 500. For example, the base component 540 may be provided in the form of backing material for the loop component 510 or the hook component 520. As another example, the base component 540, as well as the non-slip component 530 and the permanent adhesive 580, may be provided in the form of differential tape. Alternatively, the base component 540 is optional, and therefore, may be removed from the hook and loop tie 500 altogether, for example, by affixing the hook component 520 and the non-slip component 530 directly to the loop component 510.

As shown in FIG. 15, the hook and loop tie 500 may be cut from a hook and loop tie sheet 590. Preferably, the width $W_S$ of the sheet 590 is equal to the length $L_T$ of the hook and loop tie 500 and the length $L_S$ of the sheet 590 is cut to form the width $W_T$ of the hook and loop tie 500.

FIGS. 16-19 illustrate construction details for a hook and loop tie 600 according to a sixth embodiment of the present invention. The hook and loop tie 600 is similar to the hook and loop tie 200 of FIGS. 4-7. That is, the hook and loop tie 600 includes a loop component 610, such as loop fabric, a hook component 620, such as micro-hooks, and a non-slip component 630, such as differential tape, which are similar to the loop component 210, the hook component 220, and the non-slip component 230, respectively, as described above.

However, unlike the hook and loop tie 200, the hook component 620 overlaps at least a portion of the non-slip component 630. For example, as shown in FIGS. 16-19, the loop component 610 includes a first end (reference line A-A) and a second end (reference line C-C). The non-slip component 630 is affixed to the loop component 610, for example, using a permanent adhesive 631, such as thermal/hot-melt adhesives or other synthetic adhesives, and extends from the first end of the loop component 610 toward the second end of the loop component 610 (between reference line A-A and reference line D-D). The hook component 620 is affixed to the loop component 610, for example, using a permanent adhesive 640, such as thermal/hot-melt adhesives or other synthetic adhesives, extends from the second end of the loop component 610 toward the first end of the loop component 610 (between reference line B-B and reference line C-C), and overlaps at least a portion of the non-slip component 630 (between reference line B-B and reference line D-D). Preferably, the hook component 620 is affixed to the non-slip component 630, for example, using the permanent adhesive 640.

It is likewise contemplated that the loop component 610 and the hook component 620 are interchangeable.

Figure 17:
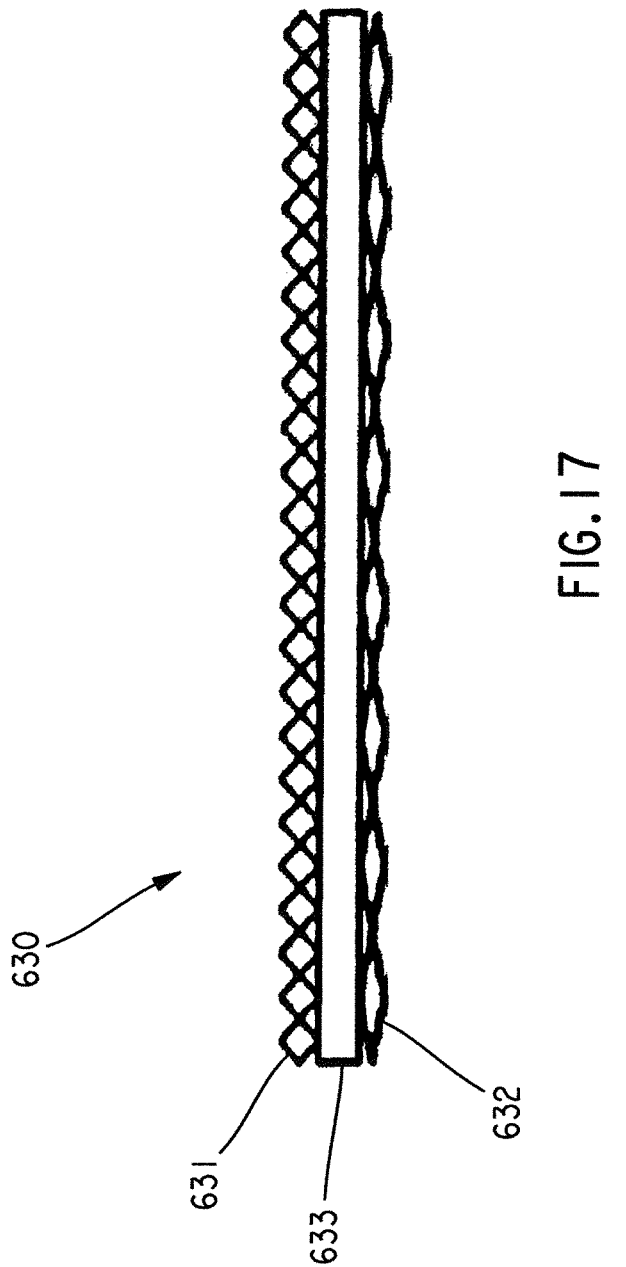
Figure 18:
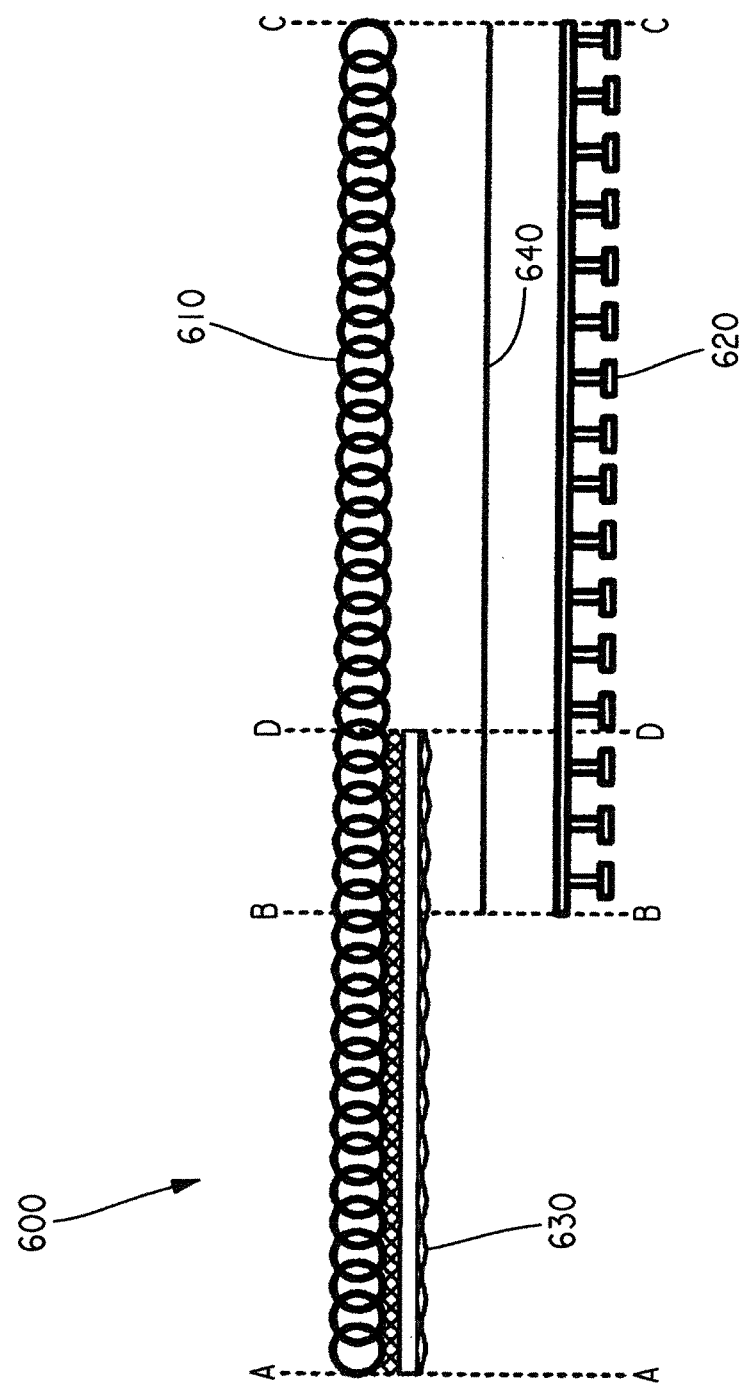

As shown in FIG. 17, the non-slip component 630 includes the permanent adhesive 631, as well as a pressure-sensitive adhesive 632 and a web 633, which are provided in the form of differential tape. However, it is likewise contemplated that the permanent adhesive 631, the pressure-sensitive adhesive 632, and the web 633 are provided as separate components or integrated with other components of the hook and loop tie 600, such as the loop component 610 and the hook component 620. Alternatively, the non-slip component 630 includes non-adhesives, such as thermoplastic elastomers (e.g., Santoprene), synthetic rubbers (e.g., Neoprene), or other non-adhesive tacky substrates.

As shown in FIG. 19, the hook and loop tie 600 includes a release liner 650, which is similar to the release liner 550 of FIG. 14. That is, the release liner 650 includes a first portion (between reference line A-A and reference line B-B) that covers the non-slip component 630, and more particularly, the pressure-sensitive adhesive 632. However, unlike the release liner 550, the release liner 650 includes a second portion (between reference line B-B and reference line D-D) that overlaps at least a portion of the hook component 620, which does not include adhesive, and therefore, the second portion forms a removal tab 651 for removing the release liner 650 from the pressure-sensitive adhesive 632.

While the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A hook and loop tie for securing a bundle of cables, the hook and loop tie comprising:
    a loop component, the loop component having a first end and a second end opposite the first end;
    a non-slip component affixed to the loop component, the non-slip component extending from the first end of the loop component toward the second end of the loop component, the non-slip component including a removable adhesive; and
    a hook component permanently affixed to the loop component using a permanent adhesive, the hook component extending from the second end of the loop component toward the first end of the loop component and overlapping at least a portion of the non-slip component.

2. The hook and loop tie of claim 1, wherein the loop component includes loop fabric.

3. The hook and loop tie of claim 1, wherein the hook component includes micro-hooks.

4. The hook and loop tie of claim 1, wherein the non-slip component includes differential tape.

5. The hook and loop tie of claim 1, wherein the non-slip component includes pressure-sensitive adhesive.

6. The hook and loop tie of claim 1, further comprising a release liner, wherein a first portion of the release liner covers the removable adhesive.

7. The hook and loop tie of claim 6, wherein a second portion of the release liner overlaps a portion of the hook component to form a removal tab for removing the release liner from the removable adhesive.

8. The hook and loop tie of claim 1, wherein the non-slip component is affixed to the loop component using a permanent adhesive.

9. The hook and loop tie of claim 1, wherein the hook component is permanently affixed to the non-slip component.

10. The hook and loop tie of claim 9, wherein the hook component is permanently affixed to the non-slip component using a permanent adhesive.

11. The hook and loop tie of claim 1, wherein the non-slip component is shorter than the loop component.

12. The hook and loop tie of claim 1, wherein the hook component is shorter than the loop component and longer than the non-slip component.

13. A method of constructing a hook and loop tie for securing a bundle of cables, the method comprising the steps of:

providing a loop component, the loop component having a first end and a second end opposite the first end;

affixing a non-slip component to the loop component, the non-slip component extending from the first end of the loop component toward the second end of the loop component, the non-slip component including a removable adhesive; and permanently affixing a hook component to the loop component using a permanent adhesive, the hook component extending from the second end of the loop component toward the first end of the loop component and overlapping at least a portion of the non-slip component.

14. The method of claim 13, further comprising affixing a release liner to the non-slip component, wherein a first portion of the release liner covers the removable adhesive.

15. The method of claim 14, wherein a second portion of the release liner overlaps a portion of the hook component to form a removal tab for removing the release liner from the removable adhesive.

16. The method of claim 13, wherein the non-slip component is permanently affixed to the loop component using a permanent adhesive.

17. The method of claim 13, wherein the hook component is affixed to the non-slip component.

18. The method of claim 17, wherein the hook component is permanently affixed to the non-slip component using a permanent adhesive.

\* \* \* \* \*

UNITED STATES PATENT AND TRADEMARK OFFICE
CERTIFICATE OF CORRECTION

| | | |
|---|---|---|
| PATENT NO. | : 8,701,252 B2 | Page 1 of 1 |
| APPLICATION NO. | : 12/957528 | |
| DATED | : April 22, 2014 | |
| INVENTOR(S) | : Jack E. Caveney et al. | |

It is certified that error appears in the above-identified patent and that said Letters Patent is hereby corrected as shown below:

In The Specification

Column 7, line 13 which reads "...component is affixed to the loop..." should read "...component is permanently affixed to the loop..."

Signed and Sealed this
Twenty-fourth Day of March, 2015

Michelle K. Lee
*Director of the United States Patent and Trademark Office*